Oct. 14, 1930.  L. A. LIDHOLM  1,778,112
INTERNAL BRAKE ADJUSTING MECHANISM
Filed Dec. 28, 1928
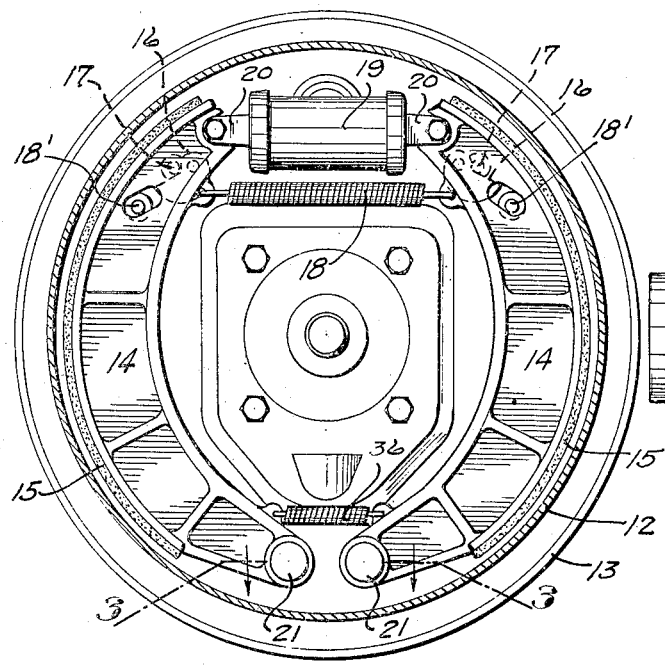
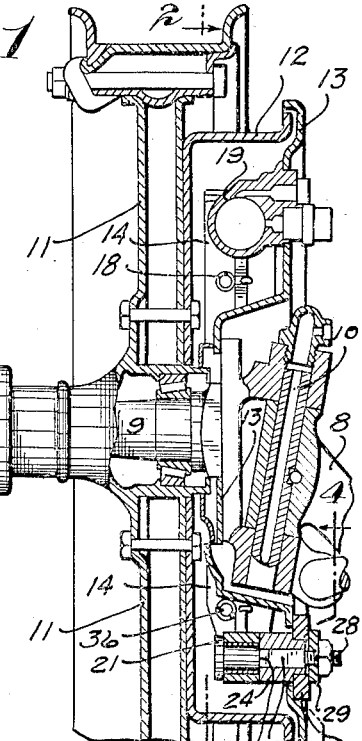
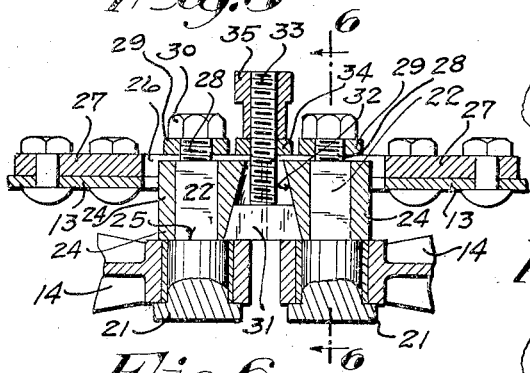
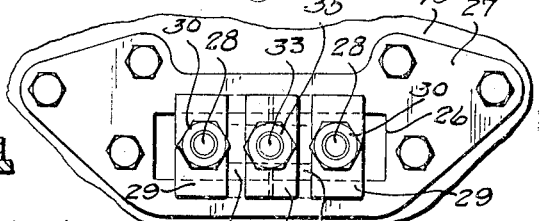
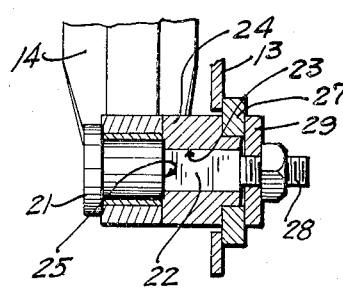
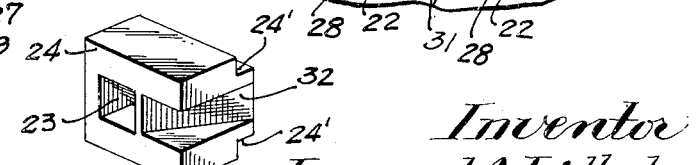
Inventor
Leonard A. Lidholm
By his Attorneys
Merchant and Kieyon Patented Oct. 14, 1930

1,778,112

UNITED STATES PATENT OFFICE

LEONARD ALFRED LIDHOLM, OF MINNEAPOLIS, MINNESOTA, ASSIGNOR OF ONE-HALF TO ALFRED T. LIDHOLM, OF MINNEAPOLIS, MINNESOTA

INTERNAL-BRAKE-ADJUSTING MECHANISM

Application filed December 28, 1928. Serial No. 328,893.

My invention relates to internal brake adjusting mechanism intended for general use, but especially well adapted for use in connection with the brakes of a motor propelled vehicle.

The invention, as illustrated, is embodied in an internal brake mechanism of that type employing a pair of horizontally opposed circumferentially extended brake shoes arranged to be expanded internally onto a brake drum, and having adjusting devices at their upper and lower ends for adjusting said shoes in respect to the drum. The adjusting devices for the lower end portions of these brake shoes are in the form of eccentric anchor pins on which said shoes are pivotally mounted. Great difficulty is experienced in adjusting this type of brake shoes for the reason that the brake adjusting mechanism is encased in the drum where it can not be seen and operable from the outside thereof. To adjust the brake shoes it is customary to first adjust the upper end portions thereof and thereafter adjust the lower end portions of the said shoes by means of the eccentric anchor pins. In certain positions of the eccentric anchor pins they impart circumferential movements to the brake shoes in respect to the drum as well as radial movements and hence throw the upper end portions of the brake shoes out of adjustments in respect to the drum 12 and as these pins cannot be seen, it is often difficult to properly position the same.

In order to facilitate the adjustment of the brake shoes it is quite the general practice to remove the wheels of the vehicle, which, of course, removes the brake drums that are attached thereto, to afford access to the brake mechanism. With the brake drum removed it is necessary to employ a false drum in the form of a ring which temporarily takes the place of said drum. This ring is removably mounted on the wheel spindle concentric thereto and having the same internal diameter as that of the brake drum in order that the brake shoes may be adjusted thereto. The brake shoes when thus adjusted are properly positioned for action on the brake drum when the wheel is again mounted on its spindle provided the internal diameter of the drum has not been increased either by wear or by refinishing on a lathe to true the same up after excessive wear.

The object of my invention is to substitute novel and simple adjusting devices for the eccentric anchor pins and by which devices the brake shoes at their lower end portions may be quickly and easily adjusted from the exterior of the drum without removing the wheel and without effecting the adjustment of the brake shoes at their upper end portions.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view showing the invention embodied in an internal brake mechanism for an automobile wheel;

Fig. 2 is a view partly in elevation and partly in vertical section taken on the line 2—2 of Fig. 1;

Fig. 3 is a fragmentary view partly in plan and partly in horizontal section taken on the line 3—3 of Fig. 2, on an enlarged scale;

Fig. 4 is a fragmentary detail view with some parts sectioned on the line 4—4 of Fig. 1;

Fig. 5 is a view corresponding to Fig. 4 with the exception that the sectioned parts thereof are shown in full;

Fig. 6 is a fragmentary detail view with some parts sectioned on the line 6—6 of Fig. 3; and Fig. 7 is a perspective view of one of the blocks removed from the bearing plate.

The numeral 8 indicates the front axle of an automobile to which the wheel spindle assembly 9 is connected by a king pin 10. A wheel 11 is mounted on the spindle assembly 9 and a brake drum 12 is bolted to said wheel at its inner face and concentric with the axis thereof. The customary dust shield 13 for the inner open face of the drum 12 is rigidly secured to the wheel spindle assembly 9.

Mounted within the drum 9 for cooperation therewith is a pair of horizontally opposed circumferentially extended segmental brake shoes 14 to the peripheries of which brake linings 15 are applied.

In the present mounting of the brake shoes 14 eccentric anchor pins, not shown, are provided for pivotally attaching said shoes at their lower ends to the dust shield 13 and which shield acts as a relatively fixed support therefor. These anchor pins are inserted through transverse bores in the lower ends of the brake shoes 14 and by rotating said pins the brake shoes may be adjusted in respect to the drum 12. The purpose of my invention is to substitute other adjusting means for these eccentric anchor pins as will presently be described.

The upper ends of the brake shoes 14 are adjusted in respect to the drum 12 by means of cams 16 pivoted to the dust shield 13 for cooperation with cam pins 17 rigidly secured to the brake shoes 14 and projects laterally therefrom. These cams 16 are individually operable from the outside of the dust shield 13 and by turning the same the upper end portions of the brake shoes 14 may be adjusted toward or from the drum 12. The brake shoes 14 are connected and normally and yieldingly held retracted by a coiled spring 18 the ends of which are attached to said shoes and guided by pins 18' near their free ends. A hydraulic braking system is used for expanding the brake shoes 14 against the drum 12 and of the parts thereof there is shown the brake cylinder 19 containing a braking fluid which acts on a pair of pistons in said cylinder. Said pistons are provided with stems 20 that are reversely extended through the heads of the cylinder 19 and attached to the free ends of the brake shoes 14. The parts thus far described are of standard and well known construction.

Referring now in detail to the invention, the numeral 21 indicates a pair of headed anchor studs that extend through the bores in the lower ends of the brake shoes 14 and support said shoes for pivotal movements thereon. These anchor studs 21 have reduced intermediate body portions 22 that extend through holes 23 in a pair of blocks 24. The stud body portions 22 are square in cross section and snugly fit in the holes 23 that are correspondingly formed to hold the studs 21 from turning in the blocks 24. Shoulders 25 on the studs 21 engage the blocks 24 and limit the movements of said studs into said blocks. The brake shoes 14 are held against axial movements on the studs 21 by the heads of said studs and the blocks 24. Both blocks 24 are independently and slidably mounted in a horizontal way 26 formed in a bearing plate 27 riveted or otherwise rigidly secured to the outer face of the dust shield 13 directly under the spindle assembly 9. This way 26 extends, as shown, tangential to an arc having its center at the axis of the drum 12. To hold the blocks 24 for straight line sliding movements in the way 26 either toward or from each other, they are rabbeted at 24' and fitted onto the longitudinal edge portions of the bearing plate 27 at said way.

On the outer end portions of the studs 21 are axially extended screw-threaded stems 28 to which are applied washer-like clamping plates 29 and nuts 30. These clamping plates 29 span the way 26 and rest on the bearing plate 27 on opposite sides of said way. By reference to Figs. 3 and 6, it will be noted that the blocks 24 do not extend completely through the way 26 so as to not interfere with the clamping action of the plates 29. By tightening the nuts 30 on the stems 28 opposing movements are imparted to the blocks 24 and clamping plates 29 to frictionally clamp said blocks and plates on opposite sides of the bearing plates 27 for adjustably and rigidly holding said blocks.

An expanding device in the form of a wedge 31 is provided for separating the blocks 24 and hence the pivoted or lower ends of the brake shoes 14 to adjust the same onto the drum 12. This wedge 31 is mounted in a pair of opposed cam seats 32 formed in the blocks 24 and has rigidly secured thereto an axially extended screw-threaded stem 33 which projects through the way 26 and has applied thereto a washer-like clamping plate 34 and a nut 35. The clamping plate 34 extends between the clamping plates 29, spans the way 26 and rests on the bearing plate 27 at opposite sides of said way. A coiled spring 36 extends between the pivoted ends of the brake shoes 14, is attached at its ends thereto and under strain to pull the respective ends of the brake shoes 14 toward each other to release the same from the brake drum 12 and hold the blocks 24 with their cam seats 32 in contact with the expanding wedge 31.

To adjust the brake shoes 14 to the drum 12 the cam-acting members 16 are first operated from the outside of the drum 12 one at a time to position the upper or free end portions of the brake shoes 14 so that they just touch said drum. After the upper ends of the brake shoes 14 are properly adjusted in respect to the drum 12, one of the nuts 30 is loosened to release the respective blocks 24 and hence the pivoted lower end of the connected brake shoe 14. With this nut 30 released the nut 35 is operated to draw the expanding wedge 31 downward on the cam seats 32 and thereby move the released block 24 in the way 26 sufficiently to cause the lower end portion of the released brake shoe 14 to just touch the drum 12. This last adjustment of the released brake shoe 14 does not in any way effect the adjustment of the upper end of said shoe which was previously made by the respective cam 16.

During the expanding action of the wedge 31 on the released block 24, the other block 24 which is rigidly secured to the bearing plate 27 acts as a base of resistance therefor. After the lower end of the released brake shoe 14 is properly adjusted to the drum 12, its nuts 30 are again tightened to rigidly clamp said block onto the bearing plate 27. The lower end of the other brake shoe 14 is next adjusted in similar manner. After the lower ends of the brake shoes 14 have been properly adjusted and the blocks 24 rigidly clamped on to the bearing plate 27 by means of the clamping plates 29 and nuts 30 to hold the same where set the cams 16 are again operated to slightly release the upper ends of the brake shoes 14 and permit the spring 18 to draw said shoes away from the drum 12.

This last adjustment is to position the brake shoes, when released, in such relation to the drum 12 that when set against the drum 12 they will engage the same throughout their entire braking surfaces.

It is highly important to note that the straight line sliding movements of the pivot studs 21 during the adjustments of the lower ends of the brake shoes 14 is such as to not interfere with or change the adjustments of the upper end portions of said shoes in which they are held by the cam 16. The springs 18 and 36 hold the brake shoes, when released, so that they are quiet.

What I claim is:

1. The combination with a brake drum and a support therein, of a pair of opposed brake shoes arranged for internal action on the drum, anchor members attaching the brake shoes to the support, and means for expanding the brake shoes onto the drum, said anchor members being mounted on the support for substantially straight line sliding adjustments tangential to an arc having its center at the axis of the drum, and an expanding device for moving the anchor members to adjust the brake shoes toward the drum, said anchor members having individual means for adjustably but rigidly securing said members to the support.

2. The combination with a brake drum and a support therein, of a pair of opposed brake shoes arranged for internal action on the drum, means for expanding the brake shoes onto the drum, a pair of blocks mounted in a way in the support for independent sliding movement toward or from each other, and anchor studs pivotally attaching the brake shoes to the blocks, said anchor studs having clamping devices for adjustably and rigidly securing the blocks to the support.

3. The structure defined in claim 2 in further combination with an expanding device for moving the blocks to adjust the brake shoes in respect to the drum.

4. The structure defined in claim 2 in further combination with an expanding device for moving the blocks to adjust the brake shoes in respect to the drum, said expanding device having means for operating the same from the opposite side of the support from the brake shoes.

5. The structure defined in claim 2 in further combination with an expanding device for moving the blocks to adjust the brake shoes in respect to the drum, and a spring under strain to draw the blocks toward each other and retract the brake shoes.

6. The structure defined in claim 2 in further combination with an expanding wedge mounted between the blocks and engaging opposed cam seats in the blocks, and a spring yieldingly holding the blocks with their cam seats contacting with the expanding wedge.

7. The structure defined in claim 2 in further combination with an expanding wedge mounted between the blocks and engaging opposed cam seats in the blocks, and a spring yieldingly holding the blocks with their cam seats contacting with the expanding wedge, said expanding wedge being operable from the opposite side of the support from the brake shoes and having means for adjustably and rigidly securing the same to the support.

8. The combination with a brake drum and a support therein, of a pair of opposed brake shoes arranged for internal action on the drum, means for expanding the brake shoes onto the drum, a pair of blocks mounted in a way in the support for independent adjustment toward or from each other, anchor studs mounted in the blocks and pivotally connecting the brake shoes thereto, said anchor studs being held from turning in the blocks and having washers and nuts applied thereto for adjustably and rigidly securing the blocks to the support, an expanding wedge mounted in opposed cam seats in the blocks and operable from the opposite side of the support from the brake shoes to separate the blocks and adjust said shoes toward the drum, and a spring yieldingly holding the blocks with their cam seats in contact with the expanding wedge.

In testimony whereof I affix my signature.

LEONARD ALFRED LIDHOLM.